W. G. WERBECK.
GAGE GLASS ILLUMINATOR.
APPLICATION FILED JAN. 2, 1919.
1,322,741.                              Patented Nov. 25, 1919.
2 SHEETS—SHEET 2.
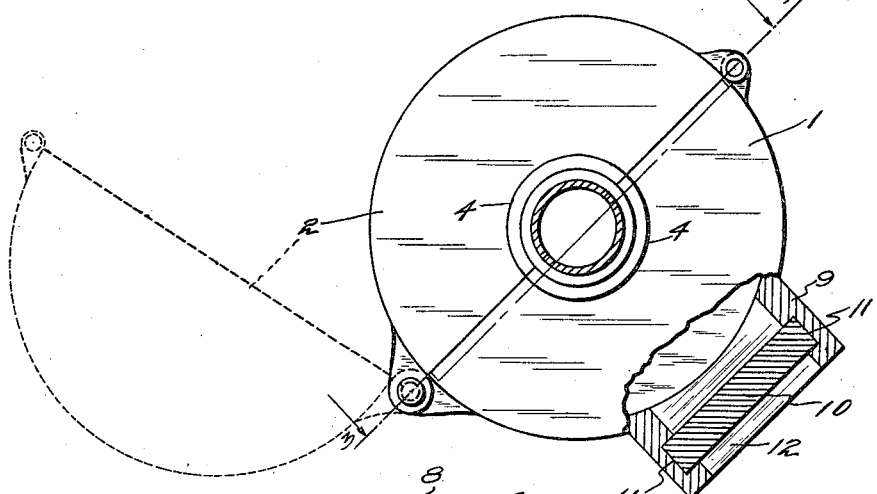
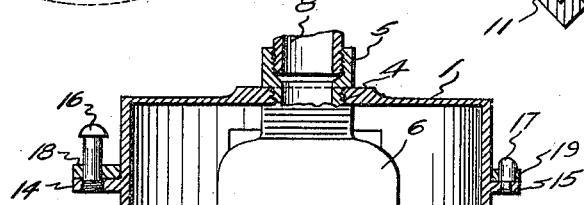
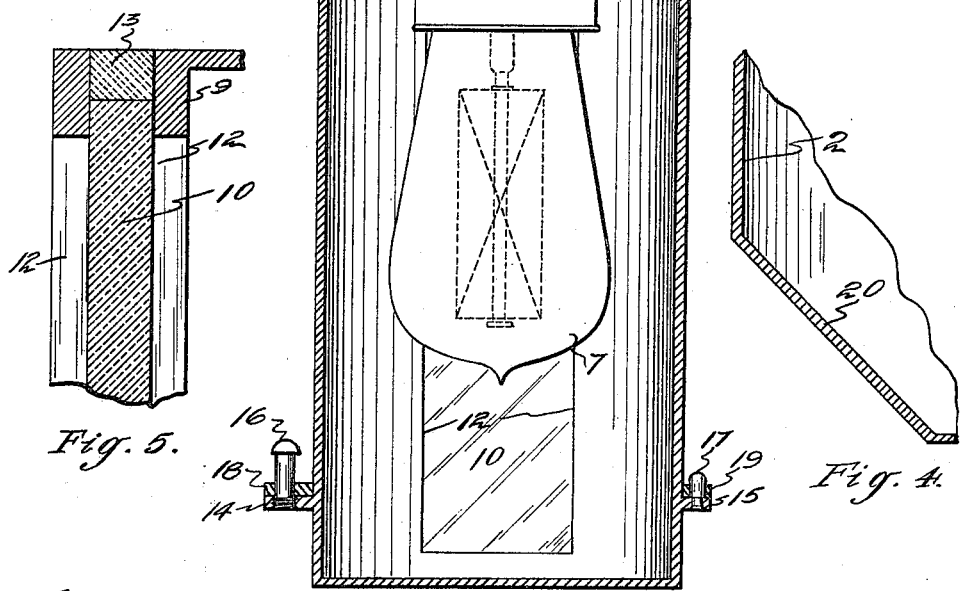
Witnesses
Paul A. Viersen
B. Perry
Inventor
W. G. Werbeck
By H. J. Sanders
Atty.

UNITED STATES PATENT OFFICE.

WALTER G. WERBECK, OF CHICAGO, ILLINOIS.

GAGE-GLASS ILLUMINATOR.

1,322,741.  Specification of Letters Patent.  Patented Nov. 25, 1919.

Application filed January 2, 1919. Serial No. 269,307.

*To all whom it may concern:*

Be it known that I, WALTER G. WERBECK, a citizen of the United States, residing at Chicago, in the county of Cook and State of Illinois, have invented certain new and useful Improvements in Gage-Glass Illuminators, of which the following is a specification.

This invention relates to improvements in gage glass illuminators for steam boilers. Since the introduction of large high pressure water tube boilers in modern power plants boiler operators and attendants generally have had difficulty in correctly observing, at all times, the gage glass water level on account of the position of the water gage which is in most instances high above the floor level and not easily or readily accessible for close or careful inspection. Many makeshifts have been designed for the purpose of facilitating the correct and instant reading of the water level in the water gage but few, if any of them, have, for one reason or another, been entirely satisfactory in use. Careful engineers desirous of maintaining the "safety first" rule in the operation of their plants have long felt the need of a simple and practical gage glass illuminator of such construction that the water tender, or other attendant, could observe the water level in the gage glass instantly and correctly from any part of the boiler room. A further object is to provide a simple, strong, durable and "fool-proof" device, low in initial cost, requiring no upkeep expense that will prove at once an investment and a safety device for the purpose intended.

The installation of my illuminator requires no change in the present boiler equipment, it has no parts to work loose and fall or get out of order, no parts need be removed from the device when a new electric bulb or gage glass is to be installed. At present the water gage is usually illuminated by an ordinary electric bulb placed in the vicinity of the gage but due to the danger from a short circuit caused by escaping steam and hot water should a gage glass burst it is impractical to place the bulb as near the gage as would otherwise be desired. My illuminator provides a bulb secured in a water and vapor proof socket all of which is inclosed in a casing provided with a protector glass that is practically unbreakable, the casing being screwed to the usual electric conduit and position one and one-half inches from or immediately adjacent the water gage; the said casing, moreover, is provided with a door which may be readily opened and closed by an attendant with the use of but one hand thus enabling him to remove or insert an electric bulb readily from a position upon a ladder or from other position which may temporarily render the use of both hands difficult. The illuminator is provided with a reflector positioned below the ordinary gage glass water level so that the surface of the water in the glass is mirrored and strongly outlined and readily readable by a party at any location in the boiler room.

A more detailed description of the invention, its construction and operation will be hereinafter set forth, pointed out in the appended claims, and illustrated in the accompanying drawings which form a part of this specification and in which—

Fig. 2 is a top plan view of Fig. 1.

Fig. 3 is a vertical sectional view taken on line 3—3 of Fig. 2.

Fig. 4 is a fragmentary sectional view illustrating the obliquely disposed portion of the reflector.

Fig. 5 is a fragmentary sectional view illustrating the protector glass and the manner of securing the same in the casing.

Like reference characters denote corresponding parts throughout the several views.

Figure 1:
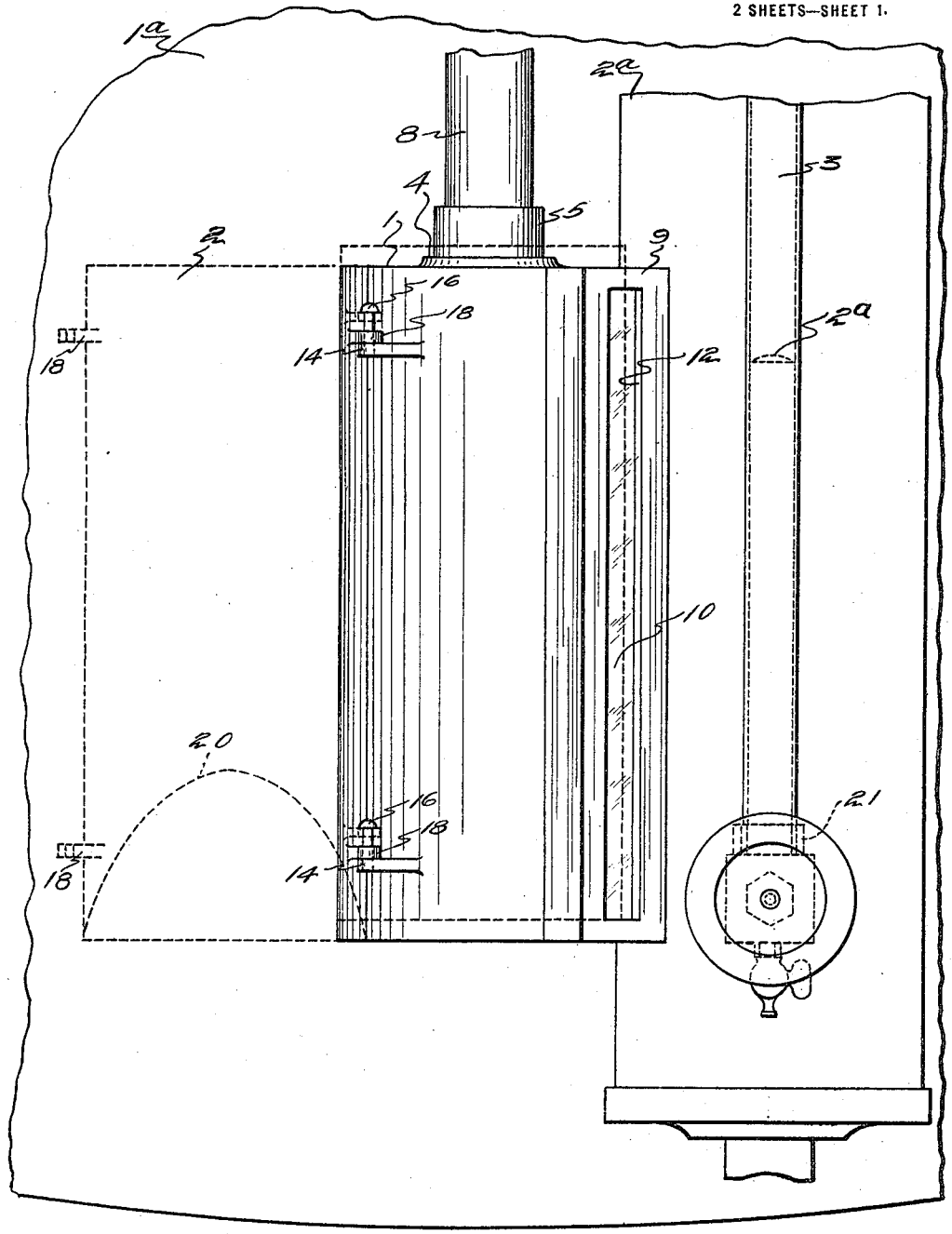
Figure 1 is a front view of my improved illuminator illustrating its application, the door being shown open in dotted position.

The reference character $1^a$ denotes the face of a boiler, $2^a$ the water column and 3 the gage glass. My invention proper comprises a substantially cylindrical casing of sectional construction, the section 1 being fixed or stationary and the section 2 being relatively movable or adapted to swing as upon a hinge, the swinging section serving practically as a door for the casing. The fixed section 1 and the swinging section are formed with the alining semi-circular perforations 4 in their upper ends, the opening in the end of the section 1 being threaded for engagement with the threaded extension 5 formed upon the water and vapor proof socket 6 that carries the electric bulb 7, the upper or free end of the extension 5 being threaded interiorly for engagement with the threaded termination of the electric conduit 8 which carries the weight of the entire illuminator. The fixed casing 1 is formed, further, with the extension 9 which is open at the top to permit the insertion of the heavy protector glass 10 which is secured in operative position in said extension by means of the oppositely disposed longitudinally grooved portions 11, 11 formed in said extension into which the said glass snugly fits. The extension 9 is formed also with the longitudinal face slot 12 which exposes the said protector glass. When the glass 10 is in position in the extension 9 it is there firmly secured by a cementing substance 13 as shown in Fig. 5.

The fixed casing section 1 is formed with ears 14, 15, the ears 14 carrying pintles 16 the heads of which are disposed a substantial distance above said ears and the ears 15 carry headless keepers 17 of lesser height than the pintles 16. The swinging casing section 2 is formed with the ears 18, 19, the ears 18 being perforated for permanent pivotal engagement with the stems of the pintles 16 and being disposed upon the said ears 14; the ears 19 of section 2 are perforated for releasable engagement with the keepers 17 aforesaid. To swing the section 2 upon the pintles 16 into open position the said section is raised manually until the ears 19 are disengaged from the keepers 17 when said section may swing freely upon the pintles 16. This opening and closing operation of the swinging section may be readily accomplished by an operator with the use of one hand when it is desired to insert or remove an electric bulb 7 from the casing.

The casing section 2 is formed with an obliquely disposed portion 20 which connects the semi-cylindrical wall of the casing section with the base of the same, the oblique portion 20 is very clearly shown in Fig. 4 and is shown in dotted lines in Fig. 1. The casing 1, 2 is so carried by the electric conduit 8 that the lower end of the casing is disposed about one inch below the usual packing nut 21 of the gage glass 3. The oblique casing portion 20 is, then, disposed a substantial distance below the normal water level in the gage glass. The casing is so positioned that the slotted portion 12 of the extension 9 is approximately one and one-half inches from the gage glass and the gage glass is directly in the path of the light rays coming through the protector glass 10 from the bulb 7. The interior surface of the swinging casing section 2 is white enameled to form a reflector for the light from the bulb 7 which, by the casing portion 20, is reflected obliquely upward toward the surface of the water in the gage glass producing upon that surface the mirrored or bulb effect and clearly and sharply outlining the water level as shown at 22, in Fig. 1, so that the level is clearly discernible from any point in the boiler room below the elevation of the water gage.

What is claimed is:—

1. In a gage glass illuminator, a sectional casing comprising a fixed section and a hinged swinging section, a longitudinally slotted extension integral with said fixed section, a protector glass in the slotted portion of said extension, a light bulb supported in the fixed section of said casing, and an obliquely disposed reflector formed in the swinging section of said casing and disposed below the said light bulb.

2. In a gage glass illuminator, a sectional casing comprising a fixed section and a hinged swinging section, a longitudinally slotted extension integral with said fixed section, a protector glass in the slotted portion of said extension, a light bulb supported in the fixed section of said casing, and an obliquely disposed reflector formed in the swinging section of said casing and disposed below the said light bulb and upon the opposite side of said light bulb with respect to said protector glass.

In testimony that I claim the foregoing as my own I have hereto affixed my signature in the presence of two subscribing witnesses.

WALTER G. WERBECK.

Witnesses:
HARRY J. CARLSON,
FRED F. SCHULZ.